Figure 1:
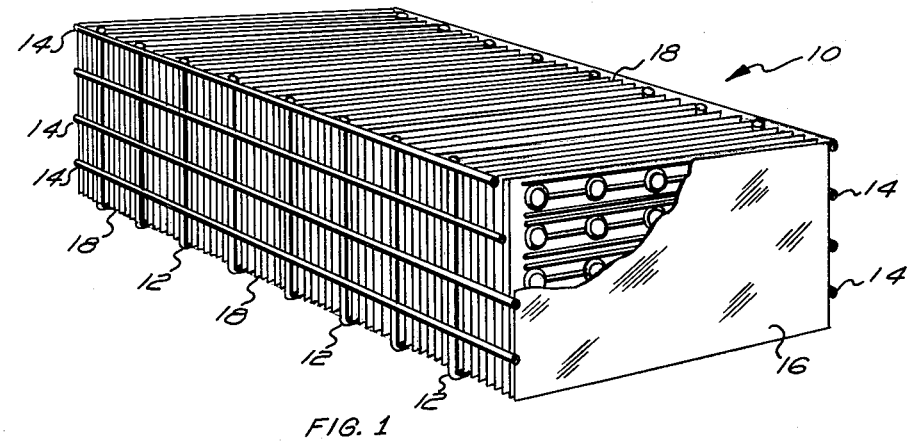

March 28, 1961  L. R. SMITH ET AL  2,977,103
COOLING TOWER STRUCTURE

Filed Nov. 25, 1957  2 Sheets-Sheet 1

INVENTOR
LEWIS R. SMITH
McLEAN A. AMBROSE
WALTER M. HASSENPLUG
BY Beaman + Beaman
ATTORNEY March 28, 1961   L. R. SMITH ET AL   2,977,103
COOLING TOWER STRUCTURE
Filed Nov. 25, 1957   2 Sheets-Sheet 2

INVENTOR
LEWIS R. SMITH
McLEAN A. AMBROSE
WALTER M. HASSENPLUG
BY Berman & Berman
ATTORNEY

United States Patent Office 2,977,103
Patented Mar. 28, 1961

2,977,103

COOLING TOWER STRUCTURE

Lewis R. Smith, McLean A. Ambrose, and Walter M. Hassenplug, Jackson, Mich., assignors to Acme Industries, Inc., Jackson, Mich., a corporation of Delaware Filed Nov. 25, 1957, Ser. No. 698,637

1 Claim. (Cl. 261—111)

The invention relates to cooling tower structure and is particularly directed to the baffles or plates used to intermingle the cooling air with the water.

The efficiency of a counterflow cooling tower is dependent on many factors including the intimacy of contact of the air and water, surface area of water per unit volume, presence of air and water bypasses or non-intermixing portions of the tower, maintenance of a constant air to water ratio over the entire cooling area and resistance of the air flow through the tower. Many types of cooling baffles or plates have been devised to effect the intermixing of the air and water, a conventional arrangement consisting of a series of vertical, closely spaced plates or baffles through which air is forced upwardly, nozzles spray water over the uppermost edges of the plates which flows down the sides of the plates mixing with the air whereby heat within the water is absorbed and carried off through evaporation.

The plates of such cooling towers are thus subjected to constant exposure of water and air and as the air surrounding commercial establishments utilizing cooling towers is often polluted with vapors of sulphur, coal tar, etc., the plates are exposed to a severe oxidizing and corroding atmosphere. For these reasons metal plates have proven troublesome and expensive to maintain, wood plates and baffles have found wide usage being relatively free from corrosion, however cooling towers of this type are very heavy, large and bulky and the plates must be periodically replaced as deposits rapidly develop thereon and rotting takes place.

It is, therefore, an object of the invention to produce a cooling tower of the wetted plate type wherein the plates are non-corrosive, lightweight, economical, and efficiently intermix the air and water passing between them.

Another object of the invention is to provide a cooling plate which produces air turbulence between the plates to increase the evaporation and cooling process, yet does not create excessive air friction requiring heavy duty air circulating means.

A further object of the invention is to design a cooling tower plate of inert plastic which will not rot, rust or otherwise deteriorate and from which deposits may be easily removed.

Yet another object of the invention is to design a cooling tower plate which will evenly spread and distribute the cooling water over the surface of the plate and which are self-spacing and aligning when assembled to form a deck.

Figure 2:
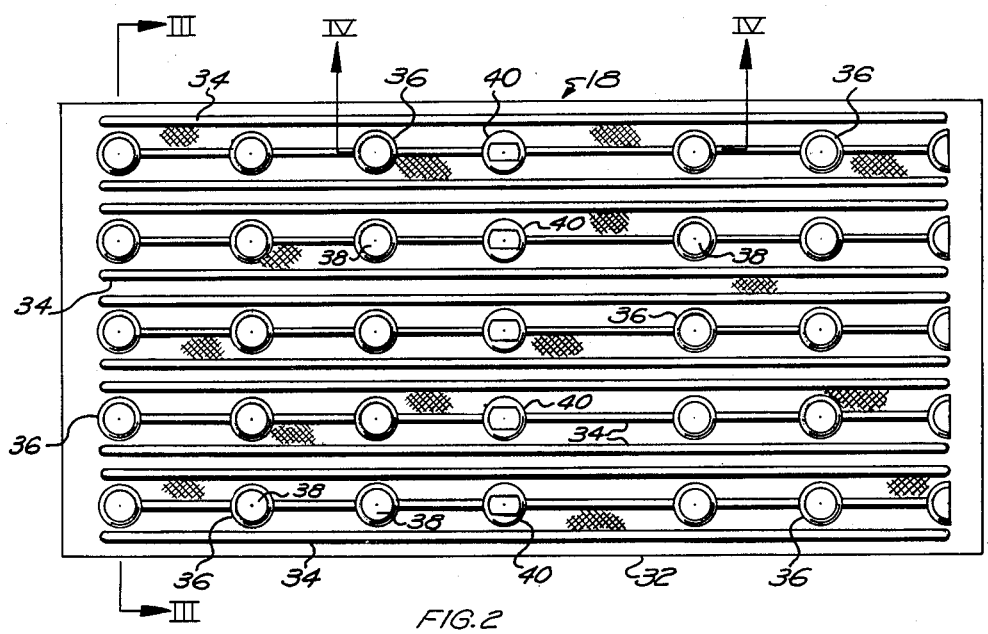
Figure 3:
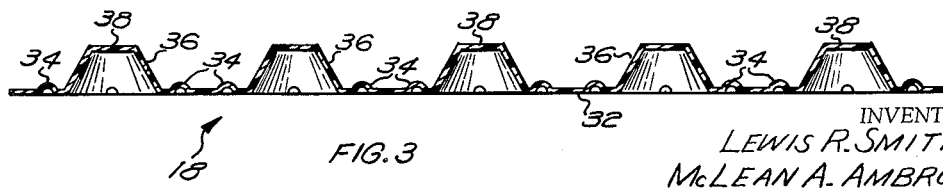
Figure 4:
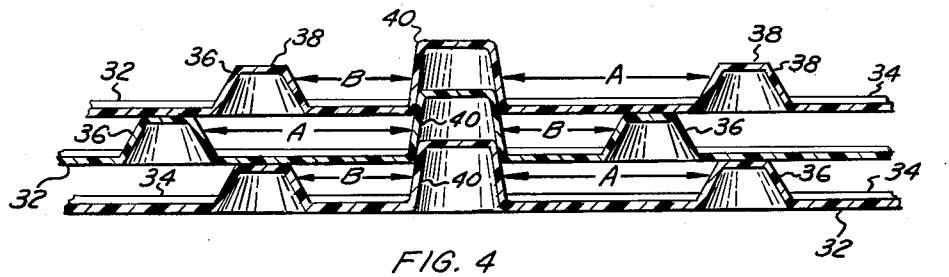
Figure 5:
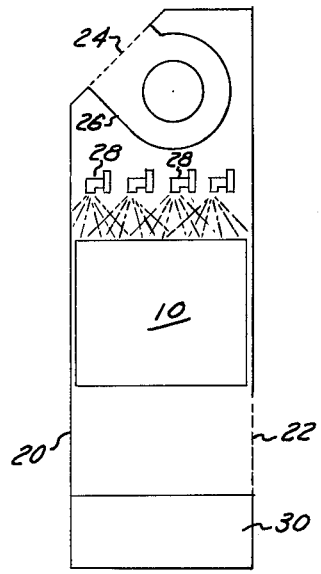

These and other objects of the invention will become apparent when viewed with regard to the following specification and drawing wherein:

Fig. 1 is a perspective view partially broken away, of a cooling deck assembly illustrating the relationship of the plates and ribs, Fig. 2 is an elevational view of one side of a cooling plate where the ribs, spacing protuberances, and aligning lugs project toward the viewer, Fig. 3 is a cross-sectional elevation view taken along the line III—III of Fig. 2, Fig. 4 is a cross-sectional view taken along the line IV—IV of Fig. 2 illustrating the cooperation between adjacent plates maintaining spacing and alignment, and Fig. 5 is a schematic end elevation view disclosing a type of cooling tower utilizing the cooling deck of the invention illustrating the preferred relationship of fluid distributing nozzles and air circulating means.

The preferred form of cooling deck 10 employing the plates or baffles of the invention is shown in Fig. 1 and consists of a rectangular box-like container, open at the top. The sides and bottom of the deck frame may be formed of spaced U-shaped wire members 12 maintained in relationship by the longitudinal wires 14 welded thereto. It will be understood that similar longitudinal wires, not shown, are welded to the bottom of the frame connecting wires 12 in the same manner as shown on the side. The ends of the frame may consist of solid metal sheets 16 welded to the ends of the wires completing the deck frame.

The cooling plates or baffles 18 are placed within the deck frame as shown in Fig. 1 whereby the entire interior of the frame is filled with plates 18 which are held in parallel spaced relation as will subsequently be apparent.

The method in which cooling deck 10 is best utilized is illustrated in Fig. 5 wherein a schematic form of cooling tower is shown. The cooling tower cabinet or housing 20 is provided with an inlet grill 22 in the lower portions and an outlet grill 24 in the upper regions through which a blower 26 exhausts. The blower 26 is located within housing 20 and tends to create a vacuum within the housing drawing air in through inlet grill 22. The cooling deck 10 is located within housing 20 intermediate grills 22 and 24 and sealing means are provided between the deck 10 and housing 20 to insure that all of the air passing through the cooling tower housing flows through the deck between plates 18 thereby obtaining maximum use of the air circulated and maintaining a low air to water ratio. The water to be cooled is sprayed over the plates 18 by a series of nozzles 28 which are located above the entire width and length of deck 10 causing water to be distributed to all of the plates. The water flows down plates 18 in intimate contact with the air flowing upward and the heat of the water is transferred to the air. The cooled water is collected in a sump 30 within housing 20 where it may be used as desired. The advantages of the counter-flow type of cooling tower are well known and by locating the blower 26 at the outlet grill rather than the inlet grill "damming" or variable pressure areas with the housing 20 are further eliminated promoting an even flow of air through all portions of the cooling deck.

The plates 18 constituting deck 10 are best shown in Figs. 2 and 3 and are molded from a single homogeneous sheet 32 of polystyrene or other chemically inert plastic. The properties necessary for the sheet material include the ability to be molded or formed, sufficient structural strength to support its own weight when placed on its edge, and the ability to be easily cleaned of foreign deposits.

A series of spaced parallel ribs 34 of arcuate cross-section are formed on sheet 32 substantially the length thereof. Ribs 34 serve to strengthen sheet 32 and to break up the riverlets of water flowing down the plate, thereby spreading the water over the entire area of the plate during the downward flow. By forming the ribs 34 horizontally at right angles to the flow of water travel the ribs spread the water without directing the flow. Thus, care should be taken in the installation of the cooling tower to level the tower whereby ribs 34 will be in proper perpendicular relation to the water flow.

Spacing between adjacent plates 18 is maintained by a plurality of protuberances 36 arranged in transverse and longitudinal rows on the plate. As in the manner of ribs 34 the protuberances 36 are also formed from the sheet 32 and as best shown in Fig. 3 have a truncated conical shape, the upper surface 38 being parallel to the general plane of plate 18. The protuberances 36 also act to intermix the air and water as air turbulence will be created by these projections.

To prevent the protuberances 36 of one plate from nesting with the protuberances 36 of adjacent plates, which would result in improper and inconsistent spacing, aligning lugs 40 are formed in a centrally located row on plate 18. The lugs 40 project from the surface of sheet 16 a greater distance than protuberances 36, Fig. 4, whereby the convex portions of lugs 40 will nest within the concave depressions of the lug 40 of the adjacent plate.

It will be noted in Figs. 2 and 4 that the spacing of the first protuberances 36 to the right and left of lugs 40 are different, e.g., the distance A is greater than the distance B. Thus, by inverting adjacent plates 18 as they are inserted in the deck 10 during the assembly thereof, the protuberances 36 of adjacent plates 18 will assume the relationship shown in Fig. 4 where the upper surface 38 contacts the planar portions of the adjacent plate insuring the correct plate spacing throughout the entire cooling deck 10.

Preferably, the sheet 32 is also embossed on the planar portions as represented in Fig. 2 aiding in spreading the water flow.

When assembled the cooling deck 10 comprises a light weight heat exchanging unit, as the water distributed by nozzles 28 flows over the plates 18 the ribs 34 and the embossed surfaces will spread the flow over the plate and, at the same time, ribs 34 and protuberances 36 create air turbulence without producing excessive air friction whereby the air traveling upward between the plates is intimately intermixed with the water which will be cooled by evaporation. By constructing the plates 18 of inert plastic the usual maintenance problems encountered with cooling plates, such as oxidation, corrosion, rotting, etc., are eliminated. Deposits due to foreign matter in the water and air are slow to form on the plastic plates and may be easily removed with a high velocity water stream or brush. The plates 18 will remain in service the life of the cooling tower, lowering maintenance and replacement costs, and the lighter weight of the plastic cooling deck permits a more efficient cooling tower to be manufactured at lower cost than heretofore achieved.

The cooling deck employing the plates 18 of the invention may be used with cooling towers other than those of the counterflow type, towers of cross flow or parallel flow principle may also effectively utilize the efficient air and water intermixing characteristics of the plates 18 to advantage.

It will be understood that various modifications of the illustrated embodiments may be made within the purview of the invention. Thus, it is not necessary that the spreading ribs, protuberances and aligning members be on the same side of the sheet but may be located on both sides thereof if desired. Likewise, the cross sections of the ribs, protuberances and lugs may be other than as disclosed yet perform similar functions. These and other modifications may be apparent to those skilled in the art without departing from the spirit and scope thereof.

We claim:

In a cooling tower, a deck comprising a plurality of horizontally spaced parallel vertical plates, said plates being formed from a planar sheet of chemically inert plastic material, and being of planar configuration, a plurality of narrow, parallel, horizontal ribs of arcuate cross section formed on one side of said plate abruptly projecting from the plane thereof, embossed planar plate portions intermediate said ribs whereby liquid flowing down over said plates alternately moves over said embossed planar portions and the arcuate surface of said ribs, the vertical width of said embossed planar portions being substantially greater than the vertical width of said ribs, spacing protuberances formed in vertical columns and horizontal rows on said plates projecting from said one side thereof adapted to maintain spacing between adjacent plates, each row of spacing protuberances centrally projecting from a common rib and extending a distance from the plane of the plate substantially greater than that of the ribs, and a plurality of concave-convex aligning lugs formed on said one side of said plate arranged in a substantially centrally located vertical column whereby the convex portion of said lugs will nest within the concave portion of the aligning lugs of the adjacent plate, said columns of spacing protuberances being asymmetrically related to said columns of lugs on the opposite sides thereof.

References Cited in the file of this patent

UNITED STATES PATENTS

| | | |
|---|---|---|
| 1,176,774 | Morris | Mar. 28, 1916 |
| 1,519,739 | Aus Der Mark | Dec. 16, 1924 |
| 2,356,653 | Cox | Aug. 22, 1944 |
| 2,793,017 | Lake | May 21, 1957 |